Figure 1:
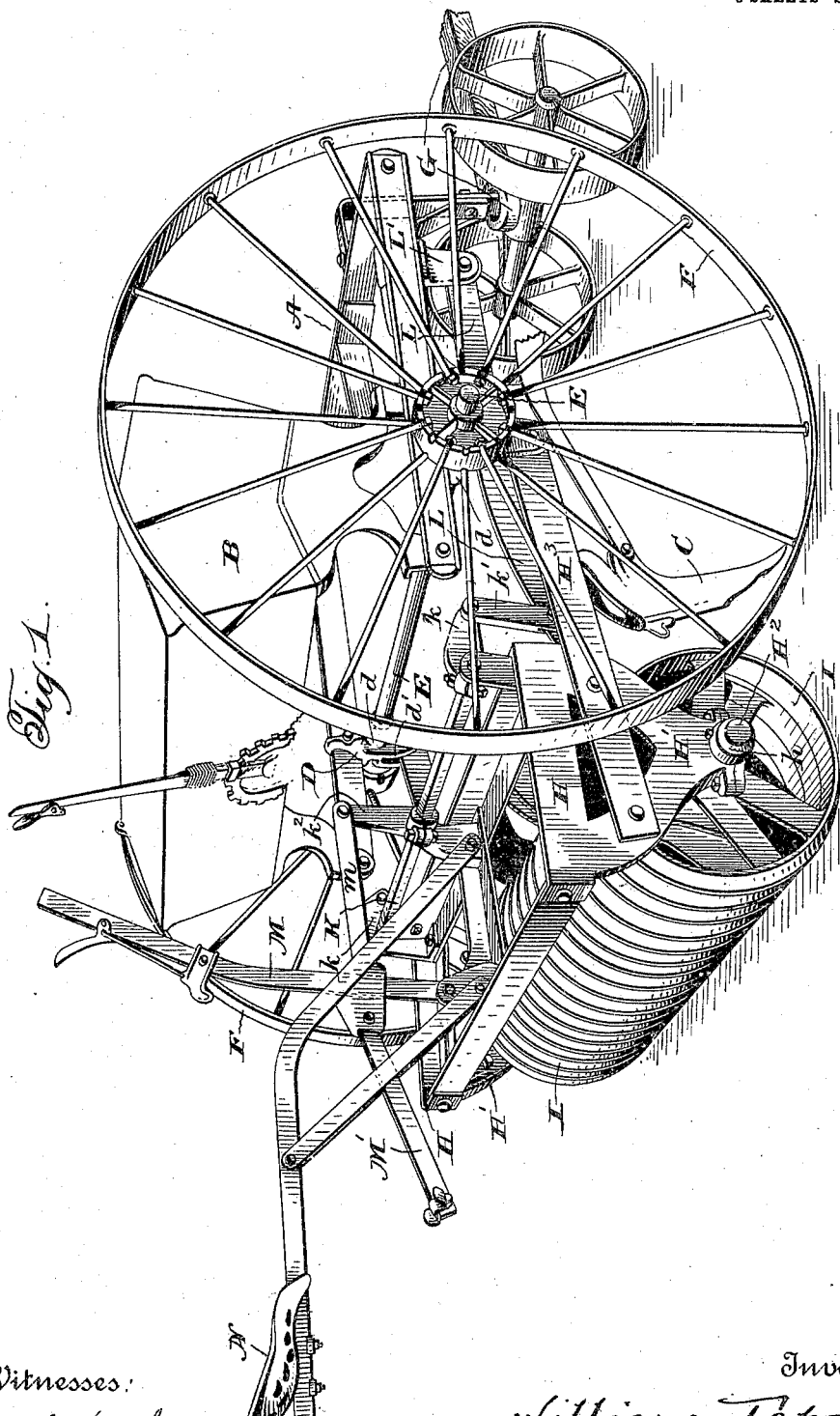

W. FETZER.
GRAIN DRILL.
APPLICATION FILED NOV. 24, 1908.

951,759.

Patented Mar. 8, 1910.
3 SHEETS—SHEET 1.

Witnesses:
Jas. E. Hutchinson
Tho. P. Strath

Inventor:
William Fetzer,
By Bacon & Milans, Attorneys.

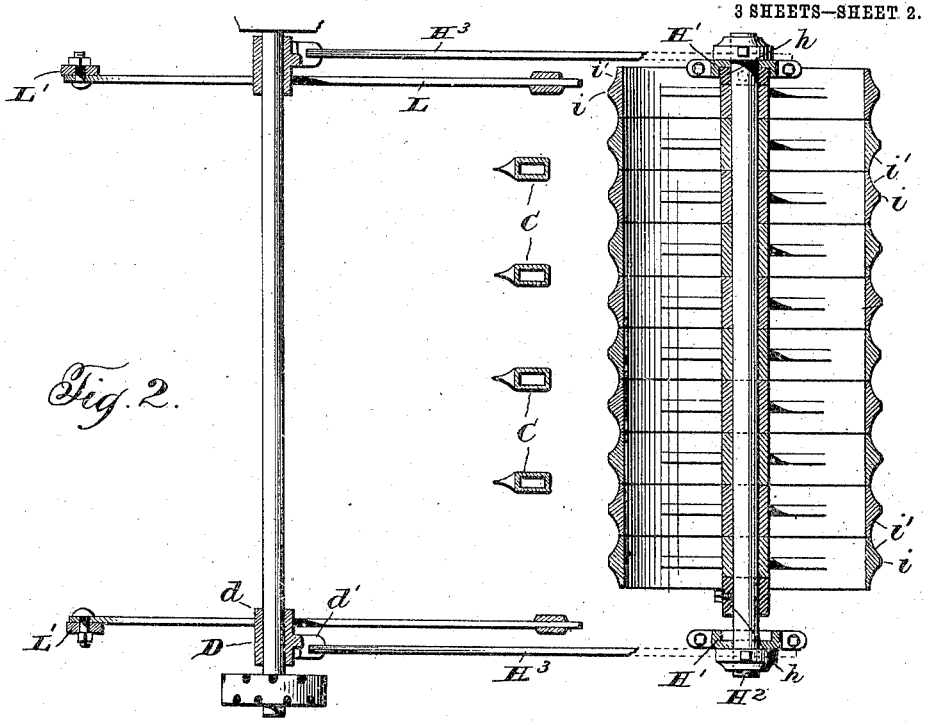
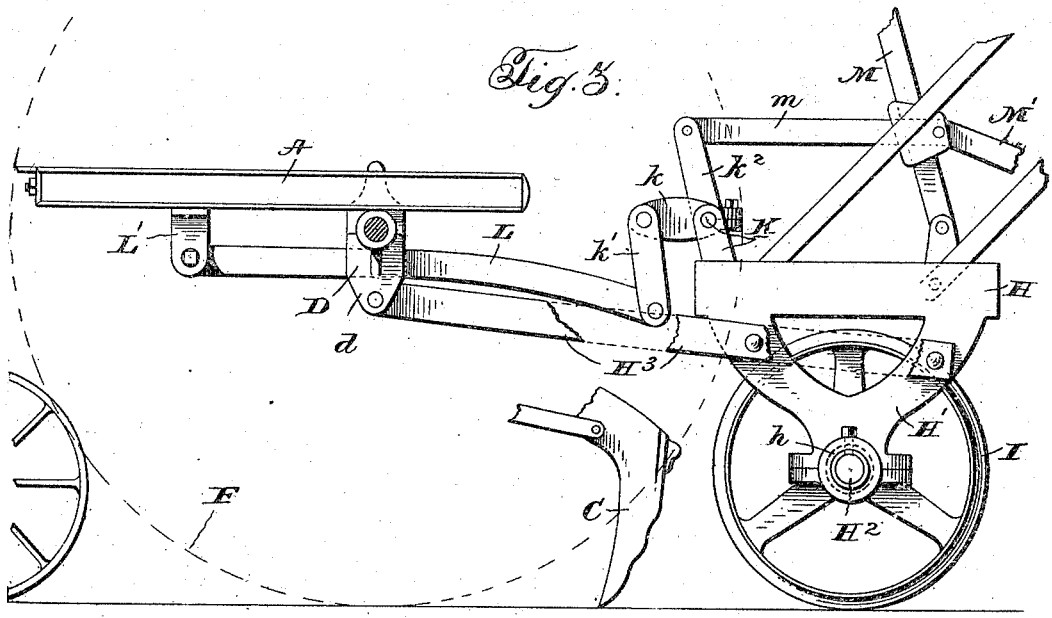

W. FETZER.
GRAIN DRILL.
APPLICATION FILED NOV. 24, 1908.

951,759.

Patented Mar. 8, 1910.

3 SHEETS—SHEET 3.

Witnesses:
Jas. E. Hutchinson
Thos. R. Hrath

Inventor:
William Fetzer,
By T. McWilliams Attorneys.

UNITED STATES PATENT OFFICE.

WILLIAM FETZER, OF MIDDLETOWN, OHIO.

GRAIN-DRILL.

951,759. Specification of Letters Patent. Patented Mar. 8, 1910.

Application filed November 24, 1908. Serial No. 464,295.

*To all whom it may concern:*

Be it known that I, WILLIAM FETZER, citizen of the United States, residing at Middletown, in the county of Butler and State of Ohio, have invented certain new and useful Improvements in Grain-Drills, of which the following is a specification, reference being had therein to the accompanying drawing.

This invention relates to an improvement in grain drills and has for its object the provision of improved means for pressing the earth over and around the furrows after the seed has been deposited therein.

In its broadest aspect, the invention comprises in combination with the furrow openers of the grain drill, roller means associated therewith adapted to tightly pack the ground immediately at the side of the seed and to lightly pack the earth over the seed. Said roller means is also preferably constructed so as to pack all of the ground between the several rows of seed and to form therein a plurality of grooves or channels. By the provision of such a construction, it has been found that the protection and growth of the seed is greatly enhanced, as the seed are covered with finely pulverized and rolled earth and the moisture preserved in the furrow. Furthermore the packing of the earth between the furrows prevents the uncovering of the seed by the wind and the grooves or channels formed between the furrows serve to retain and hold the moisture.

A further object of the present invention is the provision of presser means of this type in the form of an attachment which can be readily secured to and adapted for use in connection with any modern grain drill.

A further object of the invention is the provision in combination with a grain drill of the ordinary construction, of a press roller and means for supporting the grain drill upon its caster wheel and the press roller so that it may be readily turned or transported from place to place.

Other objects of the invention will be apparent from the detailed description hereinafter when read in connection with the accompanying drawings wherein a preferable embodiment of the invention is shown and wherein like numerals of reference refer to similar parts in the several views.

While a preferred embodiment of the invention is illustrated in the accompanying drawings, it will be understood that many changes may be made to the form therein shown without departing from the spirit of the invention.

Figure 4:
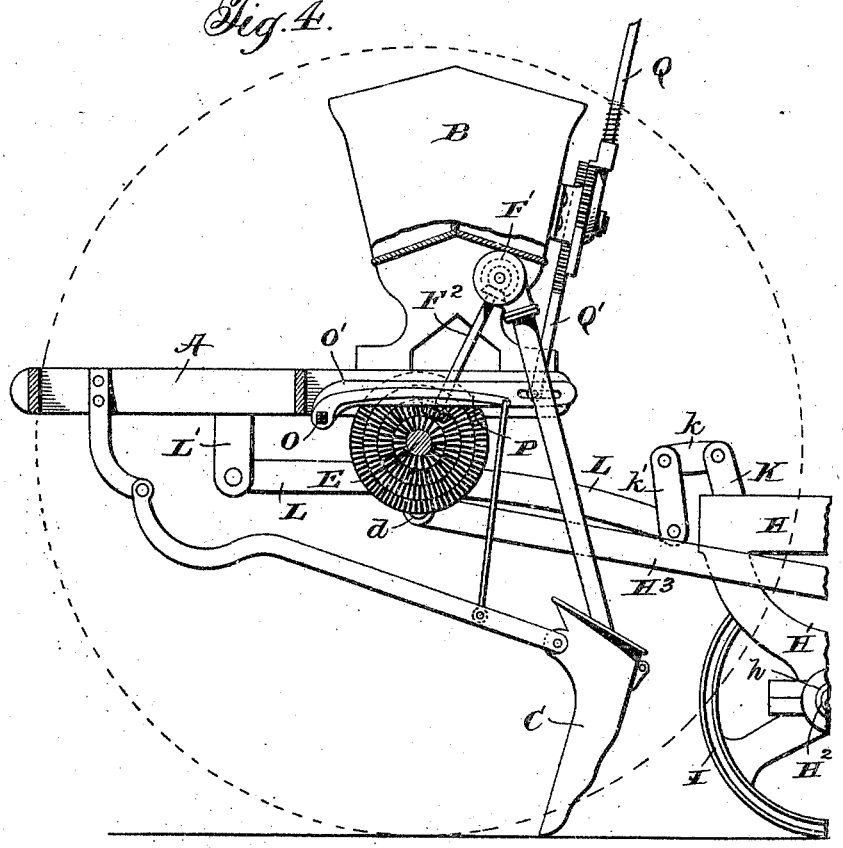
Figure 5:
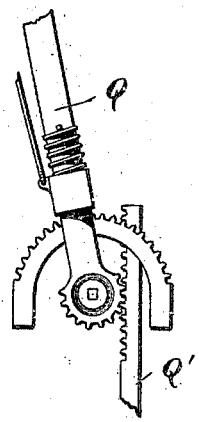

In the drawings, Figure 1 is a perspective view of a grain drill equipped with the press roller attachment, Fig. 2 is a detail sectional view illustrating the relative arrangement of the press roller and furrow openers, Fig. 3 is a partial side elevation showing the grain drill frame and the manner of attaching the press roller thereto. Fig. 4 is a longitudinal section of the drill, with portions broken away, and parts being shown in elevation; and Fig. 5 is a detail view of the lever for raising and lowering the drills.

Referring now more particularly to the drawings A designates a grain drill frame upon which is mounted a hopper B and from which is supported a plurality of drill shoes C, all of which may be of the usual construction. Depending from the side bars of the frame A of the drill are bearing blocks D in which is journaled an axle E upon the outer ends of which are secured the carrying wheels F. The feed shaft F' of the drill is preferably driven by means of a shaft $F^2$ which carries gear wheels at its opposite ends which mesh respectively with a gear wheel on said feed shaft and a gear wheel carried by the axle E, as is clearly shown in Fig. 4. Any other construction of driving the feeding instrumentalities of the drill, may, however, be utilized. The bearing blocks D are provided with sleeves $d$ extending therefrom and are extended downwardly for a slight distance below said sleeves, the lower ends of said downwardly extending portions being provided with bifurcations $d'$ therein.

The forward end of the grain drill frame is supported by a tongue truck G, which may be of any well known construction. Supported in rear of the frame of the grain drill and extending transversely thereof is a press roller which is adapted to pack the earth over and around the furrows in a manner to be hereinafter more particularly set forth, said roller comprising a frame H from the ends of which depend hangers or brackets H', in the lower ends of which brackets is fixedly secured a shaft $H^2$ upon which are mounted a plurality of independently rotatable press wheels I. The press roller is supported from the drill frame by means of draw bars $H^3$, the rear ends of which are rigidly secured to the brackets or hangers H' of the frame H and the forward ends of which are pivotally secured in the bifurcated portions d' of the bearing blocks D. The press wheels I are arranged on the shaft in close proximity to each other so as to form substantially a continuous roller and while said wheels are free to rotate independently on the shaft $H^2$, they are held against longitudinal movement thereon by collars h, which are adjustably clamped to the shaft $H^2$ adjacent the two end press wheels I. The collars h are adjustably secured to the shaft so that, if it is desired the entire press roller which is made up of the several press wheels I may be shifted on the shaft. The press wheels I are each provided on the periphery thereof with a centrally disposed convex portion i and with slightly concaved side flanges extending therefrom, so that when the wheels are assembled on the shaft a substantially corrugated press roller is obtained which is formed of a plurality of independently rotatable sections. The press wheels I are so secured upon the shaft $H^2$ with reference to the drill shoes C that the adjacent edges of the flanges i' of one pair of wheels will be positioned directly in rear of each of said drill shoes, so that during the operation of the drill, the convex portions i of the wheels will serve to pulverize and tightly pack the earth at the sides of the seed, while the adjacent flanges i' of the wheels will pack the earth very lightly over the top of the seed. By this construction, it will be seen that the earth is packed tightly at the point where it is most needed, namely, at the sides of the seed, and at the same time is packed sufficiently tightly over the seed to close all air chimneys and retain all of the moisture in the furrow, and also to prevent the wind from uncovering the seed. The press wheels I are of such a width preferably that there will be arranged one or more additional press wheels between the several pairs of wheels which lie directly in rear of the furrow openers, so that all of the earth between the furrows will be packed and a channel or a plurality of channels will be formed therein, said channels serving to retain moisture.

Inasmuch as the press wheel attachment might render it difficult to transport and turn the grain drill on its carrying wheels, means have been provided whereby the carrying wheels may be elevated and the entire drill supported upon the tongue truck G and the press roller I. In the present embodiment of the invention such means comprises a rock shaft K which is journaled in suitable bearings carried by the frame H of the press roller and is provided at the ends thereof with forwardly extending offset arms k. The offset arms k of the rock shaft K are connected by means of links k' to the rear ends of arms L, which lie along side of the inner faces of the bearing blocks D and directly under the sleeves d extending inwardly therefrom, and the forward ends of which are pivotally connected to depending brackets L', which are secured in any suitable manner to the side bars of the frame of the drill adjacent the forward end thereof. The rock shaft K is provided with an upwardly extending offset arm $k^2$ intermediate the ends thereof and such arm is connected by means of a link m with an actuating lever M which is pivotally supported in any suitable manner upon the frame of the press roller, any suitable means being provided for holding said lever in various positions of adjustment. If desired, a foot lever M' may be provided to assist the operator in actuating the rock shaft K.

N designates a seat for the operator which is supported in any suitable manner upon the frame of the press roller and from which the lever M is readily accessible. During the ordinary operation of the drill, the tongue truck G, the carrying wheels F and the press wheels I all contact with the ground. When, however, it is desired to turn the drill, the actuating lever M is shifted so as to elevate the rear ends of the arms L, which causes said arms to contact with the inwardly extending sleeves d' of the bearing blocks D, and upon further movement of the actuating lever, the drill frame and carrying wheels F will be elevated and the entire device supported upon the tongue truck G and the press roller.

As has been before stated, the press wheels I are so disposed on the shaft $H^2$ that the convex portions thereof will compress the earth at the sides of the seed. Under some conditions, however, it is desirable to apply the greatest pressure directly over the seed and for this purpose the sleeves h are provided, as it is apparent that by adjusting said sleeves on the shaft $H^2$, the press wheels I may be shifted a sufficient extent to operate in this manner.

Any suitable means for elevating and depressing the drill shoes C may be employed. I prefer, however, mechanism of substantially the type in my Patent No. 837393 December 4, 1906, and have illustrated such a device in the drawings. As is shown, particularly in Figs. 4 and 5 of the drawings, O designates a rock shaft which is journaled in the frame of the machine and to it is rigidly secured an arm O' which extends rearwardly therefrom and is provided at its free end with a suitable slot therein. P designates a lifting arm which is also rigidly connected to the shaft O and the free end of which is connected by a suitable connection with a drag bar which carries one of the drill shoes, it being understood, of course, that there is one such lifting bar provided for each drag bar. The lifting arms are actuated by means of a lever Q which is pivotally mounted on the rear face of the hopper of the drill and is provided with a gear which meshes with a sliding rack bar Q', the lower end of which is provided with a pin or projection which engages the slot in the free end of the arm O'. Obviously, from this construction, the lever Q may be readily manipulated to raise or lower the several drill shafts.

I claim:

1. In combination with a grain drill comprising a frame, supporting means therefor, furrow openers, and means for raising and lowering the furrow openers, an independent press roller pivoted to said frame in rear thereof and extending transversely of the furrow openers, and means independent of the operating means for the furrow openers for raising and lowering the drill frame.

2. In combination with a grain drill comprising a frame, supporting means therefor, furrow openers, and means for raising and lowering the furrow openers, an independent press roller frame pivoted to said frame and extending rearwardly thereof, a press roller mounted in said frame and extending transversely of the grain drill frame, and means carried by the press roller frame for raising and lowering the grain drill frame.

3. In combination with a grain drill comprising a frame, supporting means therefor, furrow openers, and means for raising and lowering the furrow openers, an independent press roller frame positioned in rear of the drill frame and connected thereto, a fixed axle extending transversely of said roller frame, a plurality of flanged press wheels loosely mounted on said axle with the edges of their rims in close proximity to form substantially a continuous corrugated press roller, a support for an operator carried by the roller frame, and means carried by the roller frame for raising and lowering the drill frame.

4. In a grain drill, a frame, carrying wheels therefor, furrow openers supported from the frame, a press roller connected to the frame in rear of said furrow openers, and means for elevating the frame and carrying wheels of the drill.

5. In a grain drill, a frame, furrow openers carried by the frame, a press roller connected to the frame in rear of the furrow openers and extending transversely thereof, means for raising and lowering the furrow openers, and independent means for raising and lowering the frame of the drill.

6. In a grain drill, a frame, a tongue truck for supporting the front end of the frame, furrow openers supported by the frame, the means for raising and lowering the furrow openers, an independent press roller frame connected to the drill frame in rear of the furrow openers, a press roller supported in said frame and extending transversely of the furrow openers, and means interposed between the drill frame and the press roller for elevating the drill frame.

7. In a grain drill, a frame, a tongue truck for supporting the front end of the frame, furrow openers supported by the frame, the means for raising and lowering the furrow openers, means carried by the drill frame for raising and lowering the furrow openers, an independent press roller frame connected to the drill frame in rear of the furrow openers, a press roller supported in said roller frame and extending transversely of the furrow openers, and means carried by the press roller frame for elevating the drill frame.

8. In a grain drill, a frame, carrying wheels therefor adapted to actuate the feeding instrumentalities of the drill, a tongue truck for supporting the front end of the drill, furrow openers carried by the frame, a press roller pivoted to the frame and positioned in rear of the furrow openers, and means for raising the drill frame and carrying wheels and supporting the same upon the tongue truck and press roller.

9. In a grain drill, a frame, furrow openers, carried by the frame, means for supporting the front end of the drill frame, means carried by the drill frame for raising and lowering the furrow openers, an independent press roller frame extending transversely of the drill frame and pivotally connected thereto, a press roller supported in said frame, and means independent of the furrow opener raising and lowering means for raising and lowering the drill frame, said means including a transverse rock shaft journaled in the press roller frame and provided with laterally projecting arms at the ends thereof, and connections between said arms and the drill frame.

10. In a grain drill, a frame, carrying wheels therefor adapted to actuate the feeding instrumentalities of the drill, means for supporting the front end of the drill a press roller frame positioned rearwardly of the drill frame and pivotally connected thereto, an arm pivotally connected at its forward end to the drill frame and underlying a relatively fixed portion thereof, a rock shaft journaled in bearings carried by the press roller frame, and a connection between said rock shaft and said arm.

11. In a grain drill, a frame, carrying wheels therefor adapted to actuate the feeding instrumentalities of the drill, means for supporting the front end of the drill a press roller frame positioned rearwardly of the drill frame and pivotally connected thereto, a pair of arms pivotally connected at their forward ends to the drill frame adjacent the front thereof and underlying relatively fixed portions of said drill frame, and means carried by the press roller frame for raising said arms.

12. In a grain drill, a frame, bearing blocks depending from the sides of said frame and provided with sleeved openings therein, an axle journaled in said sleeved openings, carrying wheels secured to the ends of said axle, means for supporting the front end of the drill, a press roller frame draw bars extending from said press roller frame and pivotally connected to the axle bearing blocks, a pair of arms pivotally connected at their forward ends to the drill frame and underlying the sleeves of the axle bearing blocks, and means carried by the roller frame for elevating said arm.

13. In a grain drill, a frame, an axle, a driving device thereon for driving the seed mechanism of a grain drill, a series of flanged roller wheels in combination with a lifting device supported on said flanged roller wheels.

14. A grain drill having a frame, a hopper and furrow openers, a lifting device supported on such frame for lifting said furrow openers, in combination with a flanged press wheel attachment having a lifting device for raising such frame and hopper.

15. In a grain drill, the combination with a frame, feed actuating mechanism, a series of furrow openers, a press roller frame extending transversely of the drill frame, and a press roller attachment formed with independently revoluble wheels having peripheral surfaces working in close proximity to each other and forming practically a continuous corrugated roller with means associated with the roller frame for adjusting the drill frame.

16. In a grain drill a frame, an axle supporting said frame, driving mechanism on said axle for actuating the feeding instrumentalities of the grain drill, a second axle carrying roller press wheels joined rearwardly to said axle and means for supporting the forward axle upon the rearward axle and roller press wheels.

17. In a grain drill a frame, an axle supporting said frame and extending beyond both sides of the frame, driving mechanism on said axle for actuating the feeding instrumentalities, a second axle carrying the roller press wheels joined rearward on said axle and means for supporting the forward axle upon the rearward axle and roller press wheels.

18. In a grain drill a frame, an axle supporting said frame, carrying wheels upon the extended ends of such axle and adapted for driving the feed mechanism, a second axle carrying roller press wheels joined rearward of said axle and means for supporting the forward axle upon the rearward axle and roller press wheels.

19. In a grain drill a frame, carrying wheels at either end of such frame adapted for driving the feed mechanism; roller press wheels secured rearward of such frame and carrying wheels and means upon such roller press wheels for raising and lowering such carrying wheels.

20. A grain drill having a frame, an axle fastened to such frame, driving devices on such axle, a second axle supported by roller press wheels in combination with a lifting device for supporting the driving axle upon the roller press wheel axle.

21. In a grain drill, the combination with a drill frame and drilling instrumentalities including feed mechanism, means for actuating the same, and furrow openers, of a press roller frame associated with the drill frame, and a series of wheels mounted in the press roller frame, said wheels having the edges of their peripheries arranged in close relation to each other, and of a substantially conical formation to form continued neighboring rows of depressions and ridges, substantially as described.

In testimony whereof I affix my signature in presence of two witnesses.

WILLIAM FETZER.

Witnesses:
H. B. KRAUSS,
S. F. BARNETT.